(12) United States Patent
Kishimoto

(10) Patent No.: US 8,665,989 B2
(45) Date of Patent: Mar. 4, 2014

(54) PHASE SHIFTER, WIRELESS COMMUNICATION APPARATUS, AND PHASE CONTROL METHOD

(75) Inventor: Shuya Kishimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 13/264,046

(22) PCT Filed: Mar. 26, 2010

(86) PCT No.: PCT/JP2010/002221
§ 371 (c)(1),
(2), (4) Date: Oct. 12, 2011

(87) PCT Pub. No.: WO2010/131408
PCT Pub. Date: Nov. 18, 2010

(65) Prior Publication Data
US 2012/0039370 A1 Feb. 16, 2012

(30) Foreign Application Priority Data
May 14, 2009 (JP) .................................. 2009-117221

(51) Int. Cl.
*H04L 27/00* (2006.01)
(52) U.S. Cl.
USPC ........... 375/295; 375/298; 375/299; 327/247; 327/248; 455/260
(58) Field of Classification Search
USPC ......... 375/295, 300, 298, 299, 261, 260, 329, 375/324; 327/247, 248, 162; 455/260
See application file for complete search history.

(56) References Cited

U.S. PATENT DOCUMENTS

| 5,535,244 | A  | * | 7/1996  | Nakatsu et al. ............... 375/261 |
| 5,787,126 | A  | * | 7/1998  | Itoh et al. ....................... 375/340 |
| 6,320,480 | B1 |   | 11/2001 | Kintis et al. |
| 6,815,993 | B1 | * | 11/2004 | Ishimoto et al. ............... 327/247 |
| 7,282,979 | B2 | * | 10/2007 | Tanaka et al. ................. 327/237 |

(Continued)

FOREIGN PATENT DOCUMENTS

| JP | 11-243351  | 9/1999  |
| JP | 2005-286569 | 10/2005 |

(Continued)

OTHER PUBLICATIONS

International Search Report, PCT/JP2010/002221, Jun. 29, 2010.

(Continued)

*Primary Examiner* — Daniel Washburn
*Assistant Examiner* — Berhanu Tadese
(74) *Attorney, Agent, or Firm* — Young & Thompson

(57) ABSTRACT

Disclosed are a phase shifter, a wireless communication apparatus, and a phase control method in which power consumption is reduced. A phase shifter includes a 90° step phase shifter (17) and a 45° phase shifter (18) and adds phase information to two baseband signals to be output to an orthogonal modulator. The 90° step phase shifter (17) contributes to adding any one of phases 0°, 90°, 180°, and 270° to the baseband signals according to a first control signal. The 45° phase shifter (18) contributes to adding one of phases 0° and 45° to the baseband signals according to a second control signal. A phase shifter (8) performs replacement of component signals of one of the baseband signals with component signals of the other of the baseband signals and inversion of polarities of the component signals.

20 Claims, 8 Drawing Sheets

(56) References Cited

U.S. PATENT DOCUMENTS

| | | |
|---|---|---|
| 7,545,856 B2 * | 6/2009 | Behzad et al. ............... 375/219 |
| 7,904,045 B2 * | 3/2011 | Aoki et al. .................. 455/260 |
| 7,928,142 B2 | 4/2011 | Oddos et al. |
| 2003/0012299 A1 * | 1/2003 | Kuchi et al. ................. 375/299 |
| 2004/0184559 A1 * | 9/2004 | Ballantyne .................. 375/300 |
| 2005/0190847 A1 * | 9/2005 | Tamura ...................... 375/260 |
| 2007/0160168 A1 * | 7/2007 | Beukema et al. ............ 375/326 |
| 2008/0025435 A1 * | 1/2008 | Yamaguchi et al. ......... 375/298 |
| 2008/0212706 A1 * | 9/2008 | Nakahara et al. ............ 375/267 |
| 2009/0017104 A1 | 1/2009 | Oddos et al. |

FOREIGN PATENT DOCUMENTS

| | | |
|---|---|---|
| JP | 2008-247905 | 10/2008 |
| WO | WO 02/17485 | 2/2002 |
| WO | WO 2006/126462 | 11/2006 |

OTHER PUBLICATIONS

Natarajan et al., A 77-GHz Phased-Array Transceiver With On-Chip Antennas in Silicon: Transmitter and Local LO-Path Phase Shifting, IEEE Journal of Solid-State-Circuits, vol. 41, No. 12, Dec. 2006, pp. 2807-2819.

Japanese Official Action—2011-513220—May 7, 2013.

* cited by examiner

PHASE SHIFTER, WIRELESS COMMUNICATION APPARATUS, AND PHASE CONTROL METHOD

TECHNICAL FIELD

The present invention relates to a phase shifter, a wireless communication apparatus, and a phase control method. In particular, the present invention relates to a phase shifter, a wireless communication apparatus, and a phase control method which are capable of adding a plurality of pieces of phase information.

BACKGROUND ART

With the recent increase in the amount of communication and information, wireless communication technology using a high-frequency band capable of transmitting a large amount of information at high speed has been attracting attention. Particularly in 60 GHz band, each transmitter can use the band of 2.5 GHz without a license. Accordingly, the use of such a radio enables communication at a speed of 1 Gbps or higher.

However, electromagnetic waves in a high-frequency band have strong directivity, which makes it difficult to establish a communication using diffracted electromagnetic waves. Therefore, if there is a shielding such as a person suddenly appearing between wireless communication apparatuses, a problem occurs in which the communication is interrupted. In such wireless communication apparatuses (wireless transmitter and receiver) using electromagnetic waves in a high-frequency band, when the communication therebetween is interrupted, it is necessary to control an antenna radiation pattern of each wireless communication apparatus to search the strongest electromagnetic wave among electromagnetic waves reflected at walls of a building or a house, and to establish a communication using a path which is a propagation channel of this electromagnetic wave.

As one method to control the radiation pattern of an electromagnetic wave output from a transmitter of a wireless communication apparatus, a method using a so-called array antenna is known. Specifically, in the method, the radiation pattern is changed by controlling a phase of a signal transmitted from each antenna element. The term "array antenna" herein described refers to an antenna in which a plurality of antenna elements are arranged in an array.

As disclosed in Non Patent Literature 1, for example, there is a method of adding phase information to a local signal output from a local oscillator by use of a phase shifter for processing a signal in a high-frequency band, in order to control a phase of a signal transmitted from an antenna. However, the phase shifter for a high-frequency band has a great loss, and thus a new amplifier is required so as to compensate for the loss. This causes a problem of an increase in circuit size and further an increase in power consumption.

In Patent Literature 1, which is the prior application of the present application, the applicant of the present application has proposed a method of configuring a phase shifter for a baseband signal band, and adding phase information about a signal transmitted from an antenna to baseband signals, without using a phase shifter for a high-frequency band having a great loss.

CITATION LIST

Patent Literature

[Patent Literature 1] Japanese Unexamined Patent Application Publication No. 2008-247905

Non Patent Literature

[No Patent Literature 1] Arun Natarajan et al., "A 77-GHz Phased-Array Transceiver With On-Chip Antennas in Silicon: Transmitter and Local LO-Path Phase Shifting", IEEE Journal of Solid-State Circuits, pp. 2807-2819, 2006.

SUMMARY OF INVENTION

Technical Problem

FIG. 8 is a diagram showing configurations of a transmitting baseband phase shifter 101 and a transmitting orthogonal modulator 102 which are proposed in Patent Literature 1. First, input terminals IN1 to IN4 receive baseband signals. Next, a 90° step phase shifter 103 and a signal mixer 104 (a so-called Gilbert cell mixer) add phase information to the input signals. The signals each including the phase information are output from output terminals OUT1 to OUT4 and transmitted to the transmitting orthogonal modulator 102. In the transmitting orthogonal modulator 102, mixers 105-1 to 105-4 mix the signals each including the phase information with local signals distributed by a distributor 107. The mixed signals are combined by a combiner 106 and output from the transmitting orthogonal modulator 102.

Although the Gilbert cell mixer has low power consumption, the Gilbert cell mixer is a current drive type mixer in which more than a little current flows. Therefore, an increase in the number of antennas causes a considerable amount of power consumption in the phase shifter.

The present invention has been made in view of the above-mentioned problems, and has an object to provide a phase shifter, a wireless communication apparatus, and a phase control method in which power consumption is reduced.

Solution to Problem

A phase shifter according to the present invention is a phase shifter that adds phase information to two baseband signals to be output to an orthogonal modulator so as to control a phase of an output signal of the orthogonal modulator, the phase shifter including: a 90° step phase shifter that contributes to adding any one of phases 0°, 90°, 180°, and 270° to the baseband signals according to a first control signal; and a 45° phase shifter that contributes to adding one of phases 0° and 45° to the baseband signals according to a second control signal. The phase shifter performs replacement of component signals of one of the baseband signals with component signals of the other of the baseband signals and inversion of polarities of the component signals.

Further, a wireless communication apparatus according to the present invention includes a phase shifter and an array antenna. The phase shifter includes: a 90° step phase shifter that contributes to adding any one of phases 0°, 90°, 180°, and 270° to the baseband signals according to a first control signal; and a 45° phase shifter that contributes to adding one of phases 0° and 45° to the baseband signals according to a second control signal. The phase shifter performs replacement of component signals of one of the baseband signals with component signals of the other of the baseband signals and inversion of polarities of the component signals.

Furthermore, a phase control method that adds phase information to two baseband signals to be mixed with a local signal so as to control a phase of an output signal of an orthogonal modulator, the phase control method comprising: performing replacement of component signals of one of the baseband signals with component signals of the other of the baseband signals and inversion of polarities of the component signals, based on phase information indicating any one of 0°, 45°, 90°, 135°, 180°, 225°, 270°, and 315°, the phase information being added to the two baseband signals to be mixed with the local signal; and executing an orthogonal modulation, wherein the execution of the orthogonal modulation includes: mixing the component signals of one of the baseband signals with local signals having relative phases of 0° and 180°, respectively, and mixing the component signals of the other of the baseband signals with local signals having relative phases of 90° and 270°, respectively, when the phase information indicates any one of 0°, 90°, 180°, and 270°; and mixing the component signals of one of the baseband signals with the local signals having the relative phases of 0° and 90°, respectively, and mixing the component signals of the other of the baseband signals with the local signals having the relative phases of 180° and 270°, respectively, when the phase information indicates any one of 45°, 135°, 225°, and 315°.

Advantageous Effects of Invention

According to the present invention, it is possible to provide a phase shifter, a wireless communication apparatus, and a phase control method in which power consumption is reduced.

DESCRIPTION OF EMBODIMENTS

Figure 1:
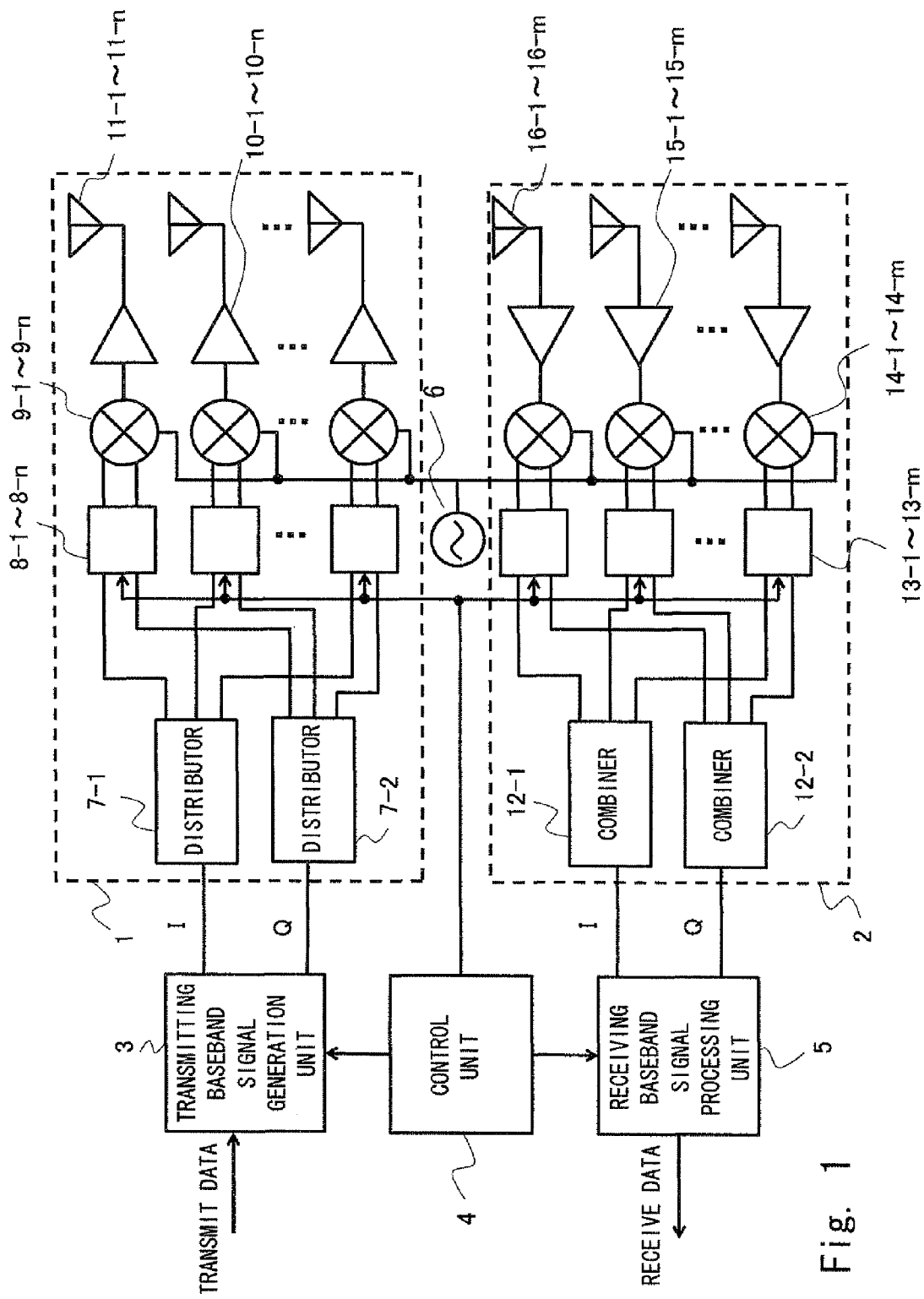
FIG. 1 is a diagram showing a configuration of a wireless communication apparatus according to a first exemplary embodiment.

Hereinafter, exemplary embodiments of a phase shifter, a wireless communication apparatus, and a phase control method according to the present invention will be described with reference to the drawings.
First Exemplary Embodiment First, a wireless communication apparatus according to a first exemplary embodiment of the present invention will be described with reference to FIG. 1. The wireless communication apparatus shown in FIG. 1 includes a transmitter 1, a receiver 2, a transmitting baseband signal generation unit 3, a control unit 4, a receiving baseband signal processing unit 5, and a local oscillator 6.

The transmitter 1 includes distributors 7-1 and 7-2, transmitting baseband phase shifters 8-1 to 8-n, transmitting orthogonal modulators 9-1 to 9-n, transmitting amplifiers 10-1 to 10-n, and transmitting antennas 11-1 to 11-n. On the other hand, the receiver 2 includes combiners 12-1 and 12-2, receiving baseband phase shifters 13-1 to 13-m, receiving orthogonal demodulators 14-1 to 14-m, receiving amplifiers 15-1 to 15-m, and receiving antennas 16-1 to 16-m.

The transmitting antennas 11-1 to 11-n and the receiving antennas 16-1 to 16-m form an array antenna in which the antennas (antenna elements) are arranged in an array. A local signal output from the local oscillator 6 is divided into two signals to be input to the transmitter 1 and the receiver 2, respectively. In the transmitter 1, the local signal is divided into n number of signals corresponding to the antenna array number n. Similarly, also in the receiver 2, the received local signal is divided into m number of signals corresponding to the antenna array number m.

First, the transmitter 1 will be described. The transmitting baseband signal generation unit 3 generates so-called I (In-phase) signal and Q (Quadrature-phase) signal from the received transmit data. The generated I signal and Q signal are divided into n number of signals by the distributors 7-1 and 7-2 and are input to the transmitting baseband phase shifters 8-1 to 8-n. On the other hand, the local signal output from the local oscillator 6 is divided into n number of signals to be input to the transmitting orthogonal modulators 9-1 to 9-n.

The transmitting baseband phase shifters 8-1 to 8-n add phase information (phase control amount) corresponding to the transmitting antennas 11-1 to 11-n to the I signal and the Q signal according to a control signal output from the control unit 4. The operation and configuration of the transmitting baseband phase shifters 8-1 to 8-n will be described in detail later with reference to first to fourth exemplary embodiments to be described later.

The I signal and the Q signal each including phase information are input to the transmitting orthogonal modulators 9-1 to 9-n. The transmitting orthogonal modulators 9-1 to 9-n modulate the received local signals (n number of divided local signals) according to the I signal and the Q signal each including phase information, and output the modulated signals to the transmitting amplifiers 10-1 to 10-n.

The transmitting amplifiers 10-1 to 10-n amplify the received signals to a predetermined transmission power level, and deliver the amplified signals from the transmitting antenna 11-1 to 11-n.

Next, the receiver 2 will be described. The m number of divided local signals are input to the receiving orthogonal demodulators 14-1 to 14-m. The receiving amplifiers 15-1 to 15-m amplify signals received by the receiving antennas 16-1 to 16-m to a predetermined power level, and output the amplified signals to the receiving orthogonal demodulators 14-1 to 14-m.

The receiving orthogonal demodulators 14-1 to 14-m demodulate the signals received from the receiving amplifiers 15-1 to 15-m with the local signals, and output the demodulated I signal and Q signal to the receiving baseband phase shifters 13-1 to 13-m.

The receiving baseband phase shifters 13-1 to 13-m add phase information corresponding to the receiving antennas 16-1 to 16-m to the I signal and the Q signal, which are received from the receiving orthogonal demodulators 14-1 to 14-m, according to the control signal received from the control unit 4. The I signal and the Q signal each including phase information are combined by the combiners 12-1 and 12-2, respectively, and are input to the receiving baseband signal processing unit 5, thereby generating receive data.

In the wireless communication apparatus shown in FIG. 1, the transmitting baseband signal generation unit 3, the receiving baseband signal processing unit 5, and the control unit 4 may be implemented by hardware such as a so-called DSP (Digital Signal Processor) or may be implemented by causing a processor (CPU: Central Processing Unit) to execute the above-mentioned functions as software or programs. These programs can be stored in various types of non-transitory computer readable media and supplied to a computer. Examples of the non-transitory computer readable media include various types of tangible storage media. Examples of non-transitory computer readable media include magnetic recording media (for example, flexible disks, magnetic tapes, and hard disk drives), magneto-optical media (for example, magneto-optical disks), read-only memories (CD-ROMs), CD-Rs, CD-R/Ws, and semiconductor memories (for example, mask ROMs, programmable ROMs (PROMs), erasable PROMs (EPROMs), flash ROMs, and RAMs). The programs may be stored in various types of transitory computer readable media to be supplied to a computer. Examples of the transitory computer readable media include electric signals, light signals, and electromagnetic waves. The transitory computer readable media allow the programs to be supplied to a computer through a wired communication path such as an electric wire or an optical fiber, or through a wireless communication path.

Figure 2:
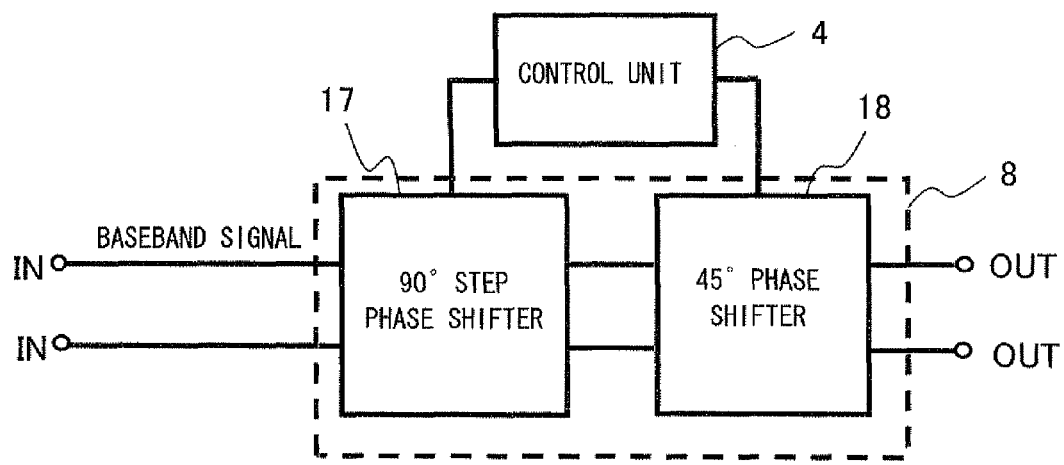
FIG. 2 is a diagram showing a configuration of a phase shifter according to the first exemplary embodiment.

Hereinafter, referring to FIG. 2, a configuration example of a transmitting baseband phase shifter 8 included in the transmitting baseband phase shifters 8-1 to 8-n will be described.

The transmitting baseband phase shifter 8 includes a 90° step phase shifter 17 that contributes to adding phase information indicating any one of 0°, 90°, 180°, and 270°, and a 45° phase shifter 18 that contributes to adding phases of 0° and 45°.

The 90° step phase shifter 17 and the 45° phase shifter 18 add phase information corresponding to the control signal to baseband signals based on the control signal from the control unit 4.

Specifically, the 90° step phase shifter 17 and the 45° phase shifter 18 perform replacement of component signals of one of the baseband signals with component signals of the other of the baseband signals and inversion of polarities of the component signals. According to the configuration example shown in FIG. 2, a Gilbert cell mixer is not used, thereby making it possible to reduce the power consumption in the phase shifter to approximately zero.

Figure 3:
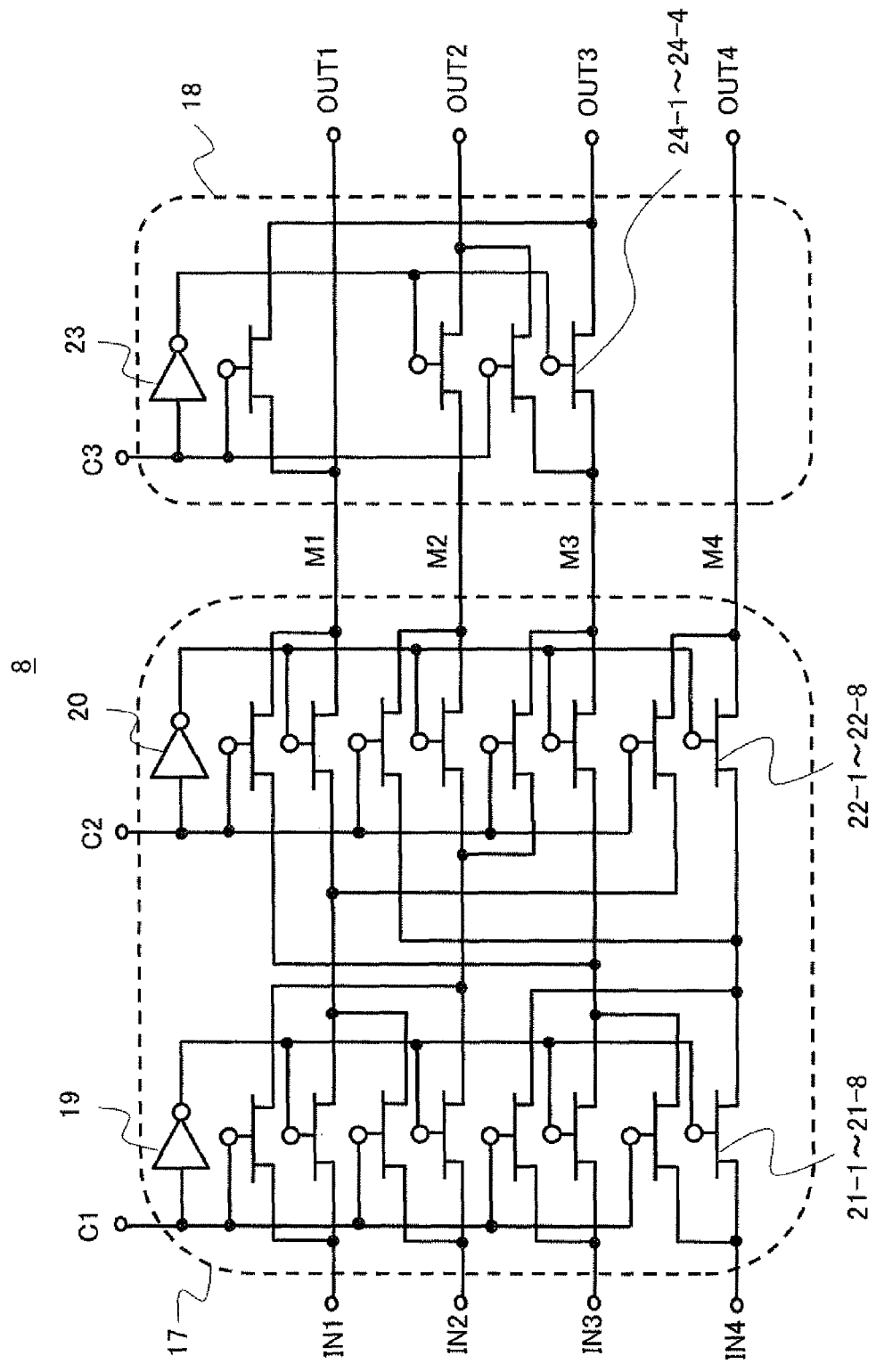
FIG. 3 is a diagram showing a configuration of a phase shifter according to the first exemplary embodiment.

Referring next to FIG. 3, a specific configuration example of the transmitting baseband phase shifter 8 will be described in detail.

The 90° step phase shifter 17 includes at least two inverters 19 and 20 and at least 16 switches (switching elements) 21-1 to 21-8 and 22-1 to 22-8.

The switches 21-1 to 21-8 are controlled by a control signal C1. The switches 22-1 to 22-8 are controlled by a control signal C2. The control signals C1 and C2 are supplied from the control unit 4.

The I signal, which is a differential signal, is input to each of an input terminal IN1 and an input terminal IN2 of the transmitting baseband phase shifter 8. Similarly, the Q signal is input to each of an input terminal IN3 and an input terminal IN4. Paths for the input I signal and Q signal are switched by the control signal C1 and the control signal C2. The I signal and the Q signal are output from output terminals M1, M2, M3, and M4 depending on the switching state. At this time, the baseband signals output to the output terminal M1 and the output terminal M2 are a differential pair. The baseband signals output to the output terminal M3 and the output terminal M4 are also a differential pair.

The 45° phase shifter 18 includes at least one inverter 23 and at least four switching elements 24-1 to 24-4. The switches 24-1 to 24-4 are controlled by a control signal C3. The control signal C3 is supplied from the control unit 4, as with the control signals C1 and C2.

Specifically, in the case of adding phase information indicating any one of 0°, 90°, 180°, and 270°, the 45° phase shifter 18 directly outputs the I signal and the Q signal, which are output from the 90° step phase shifter 17, to the transmitting orthogonal modulator, without performing any other operation on the I signal and the Q signal.

On the other hand, in the case of adding phase information indicating any one of 45°, 135°, 225°, and 315°, the 45° phase shifter 18 branches a signal having one polarity among component signals of one of the baseband signals of the received I signal and Q signal into two signals, and outputs the two signals from the output terminal OUT1 and the output terminal OUT3. The 45° phase shifter 18 blocks a signal having the other polarity among the component signals of the baseband signal. On the other hand, the 45° phase shifter 18 outputs component signals of the baseband signal, which are not branched and blocked, from the output terminal OUT2 and the output terminal OUT4.

The path switching is executed based on the relation between phase information (θ) and output signals shown in Table 1 according to the phase information to be added. Table 1 is a table showing the relation between the phase information and output signals in the first exemplary embodiment of the present invention. The 90° step phase shifter 17 and the 45° phase shifter 18 perform replacement of signals +I, −I, +Q, and −Q and inversion of polarities as illustrated in Table 1.

TABLE 1

| θ (deg) | C1 | C2 | C3 | Out1 | Out2 | Out3 | Out4 |
|---|---|---|---|---|---|---|---|
| 0 | 0 | 0 | 0 | +I | −I | +Q | −Q |
| 45 | 0 | 0 | 1 | +I | +Q | +I | −Q |
| 90 | 1 | 1 | 0 | −Q | +Q | +I | −I |
| 135 | 1 | 1 | 1 | −Q | +I | −Q | −I |
| 180 | 1 | 0 | 0 | −I | +I | −Q | +Q |
| 225 | 1 | 0 | 1 | −I | −Q | −I | +Q |
| 270 | 0 | 1 | 0 | +Q | −Q | −I | +I |
| 315 | 0 | 1 | 1 | +Q | −I | +Q | +I |

Figure 8:
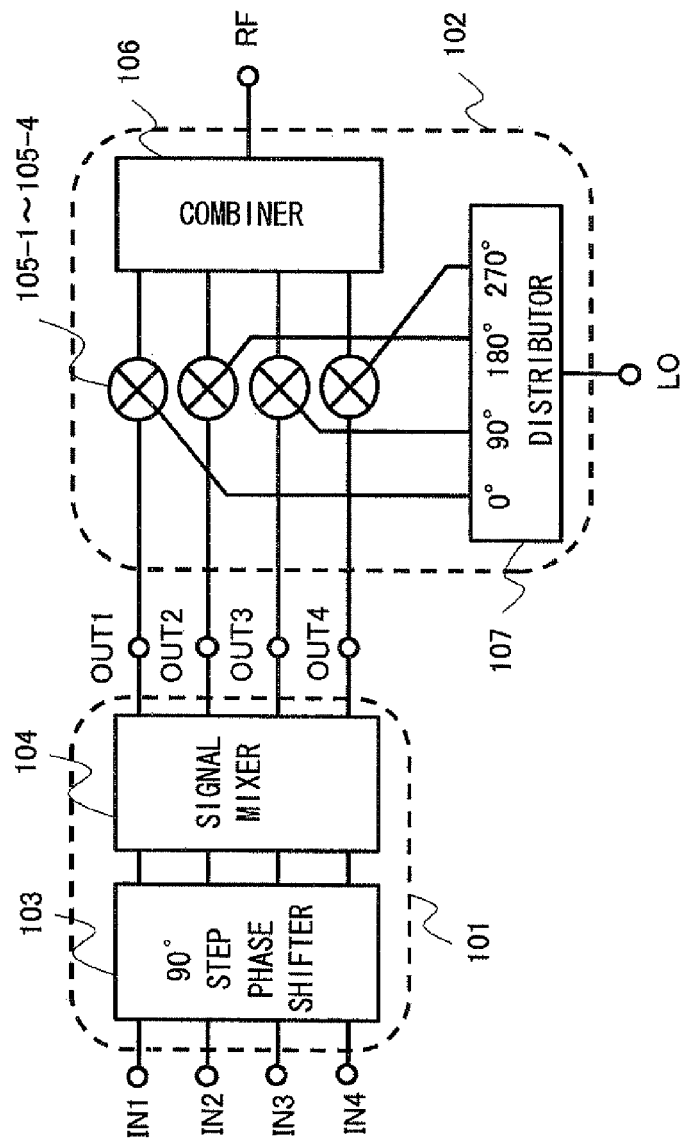
FIG. 8 is a diagram showing configurations of a phase shifter and an orthogonal modulator of the prior application.

The baseband signal output from the output terminal OUT1 of the transmitting baseband phase shifter 8 is input to the mixer 105-1, which receives a local signal having a relative phase of 0°, of the transmitting orthogonal modulator 102 in the same manner as in the transmitting baseband phase shifter 101 shown in FIG. 8. The baseband signal output from the output terminal OUT2 is input to the mixer 105-2 which receives a local signal having a relative phase of 180°. The baseband signal output from the output terminal OUT3 is input to the mixer 105-3 which receives a local signal having a relative phase of 90°. The baseband signal output from the output terminal OUT4 is input to the mixer 105-4 which receives a local signal having a relative phase of 270°.

In Table 1, values 0 and 1 are used to indicate each state of the control signals C1, C2, and C3. The values respectively represent a low voltage level ("0" logical level) and a high voltage level ("1" logical level) of the control signals (C1, C2, and C3). If the relation of the input-output is the same, the states of each control signal are not limited to those shown in table 1. Further, when it is a circuit satisfying the relation of table 1, the number of inverters and switches are not limited to the numbers shown in FIG. 3.

In this exemplary embodiment, the control unit 4 can refer to the information shown in Table 1 from the inside or from the outside of the control unit 4 as a table (look-up table), for example. In this case, the control unit 4 determines a combination of the control signals C1, C2, and C3 to be output according to the required phase.

Herein, the phrase "can refer to the information from the inside of the control unit" means referring to a look-up table stored in a register provided in the control unit 4, for example. The look-up table is a loaded look-up table stored in an external storage medium (for example, a hard disk drive (HDD) or a flash memory) simultaneously with power ON.

The phrase "can refer to the information from the outside of the control unit" means directly referring to a look-up table stored in an external storage medium, for example, to determine a phase control signal.

According to the configuration example of FIG. 3, the transmitting baseband phase shifter 8 serving as the transmitting baseband phase shifters 8-1 to 8-n adds phase information indicating any one of 0°, 45°, 90°, 135°, 180°, 225°, 270°, and 315°. This enables reduction in power consumption to approximately zero and setting of the resolution of added phase information to 45°.

Though only the transmitting side is described in this exemplary embodiment, similar operations are also performed on the receiving side.

Second Exemplary Embodiment

Figure 4:
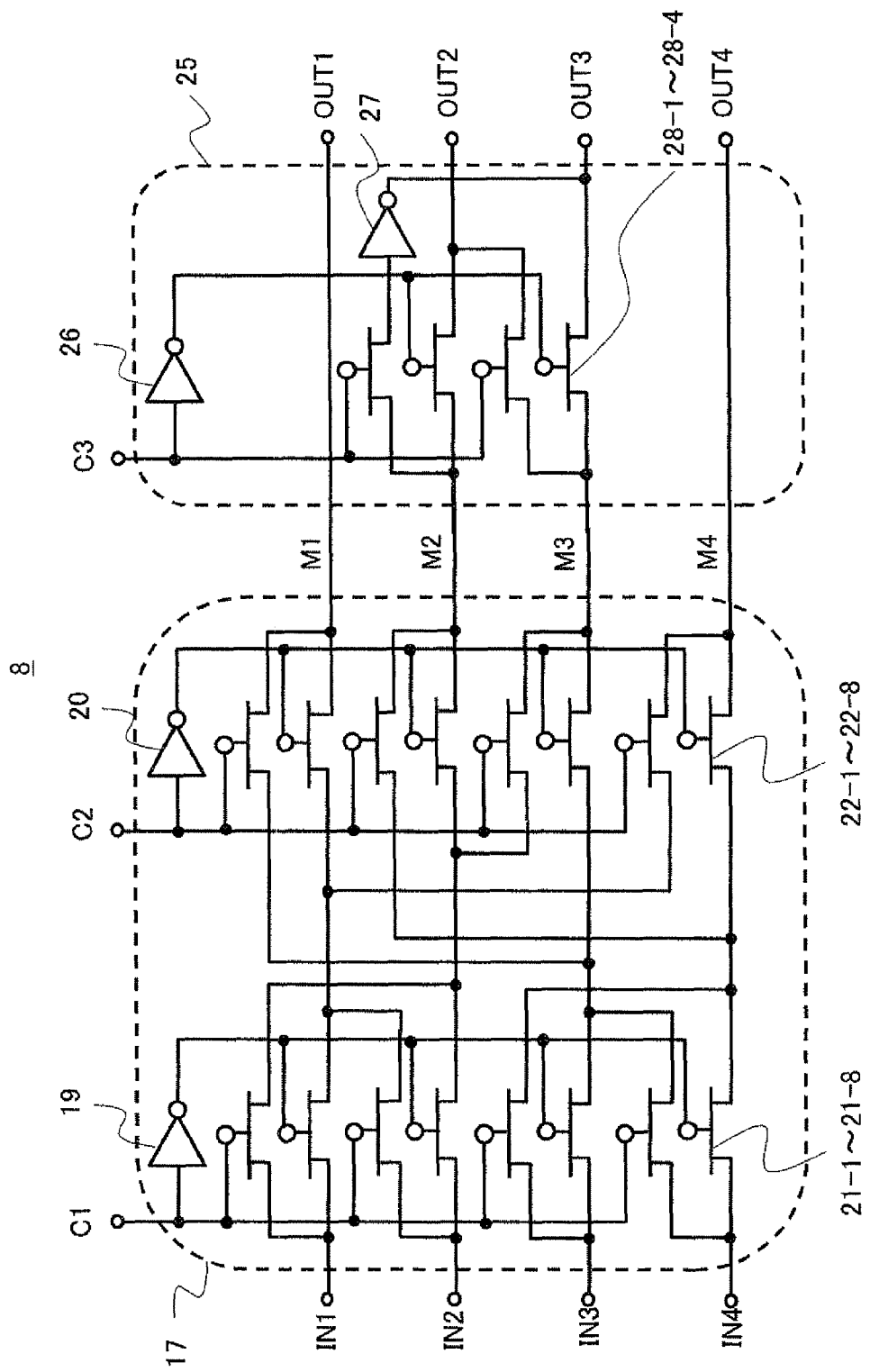
FIG. 4 is a diagram showing a configuration of a phase shifter according to a second exemplary embodiment.

A configuration example of a phase shifter according to a second exemplary embodiment of the present invention will be described below with reference to FIG. 4. The transmitting baseband phase shifter 8 shown in FIG. 4 includes the transmitting baseband phase shifters 8-1 to 8-n shown in FIG. 1. The transmitting baseband phase shifter 8 shown in FIG. 4 adds phase information indicating any one of 0°, 45°, 90°, 135°, 180°, 225°, 270°, and 315° to baseband signals output from the transmitting baseband signal generation unit 3.

Specifically, in this exemplary embodiment, the baseband phase shifter 8 includes the 90° step phase shifter 17 that contributes to a 90° step phase change, and a 45° phase shifter 25 that contributes to a 45° phase change. The 90° step phase shifter 17 is identical with that of the first exemplary embodiment, so the description thereof is omitted.

The 45° phase shifter 25 includes an inverter 26 that inverts a control signal, an inverter 27 that inverts polarities of baseband signals, and at least four switching elements 28-1 to 28-4. The switches 28-1 to 28-4 are controlled by the control signal C3. The control signal C3 is supplied from the control unit 4, as with the control signals C1 and C2.

In the same manner as in the first exemplary embodiment, the path switching is executed based on the relation between the phase information (θ) and output signals shown in Table 1 according to the phase information to be added.

Specifically, in the case of adding phase information indicating any one of 45°, 135°, 225°, and 315°, the 45° phase shifter 25 outputs a signal having one polarity among component signals of one of the baseband signals of the received I signal and Q signal from the output terminal OUT1. In the 45° phase shifter 25, the inverter 27 inverts the polarity of a signal having the other polarity among the component signals of the baseband signal, and the inverted signal is output from the output terminal OUT3. The 45° phase shifter 25 outputs component signals of the baseband signal, which are not branched and blocked, from the output terminal OUT2 and the output terminal OUT4. Consequently, the relation between the phase information and output signals shown in Table 1 can be achieved without branching the component signals of the baseband signals.

The baseband signals output from the output terminals OUT1 to OUT4 of the transmitting baseband phase shifter 8 are input to the orthogonal modulator as in the first exemplary embodiment.

Though only the transmitting side is described in this exemplary embodiment, similar operations are also performed on the receiving side.

Third Exemplary Embodiment

Figure 5:
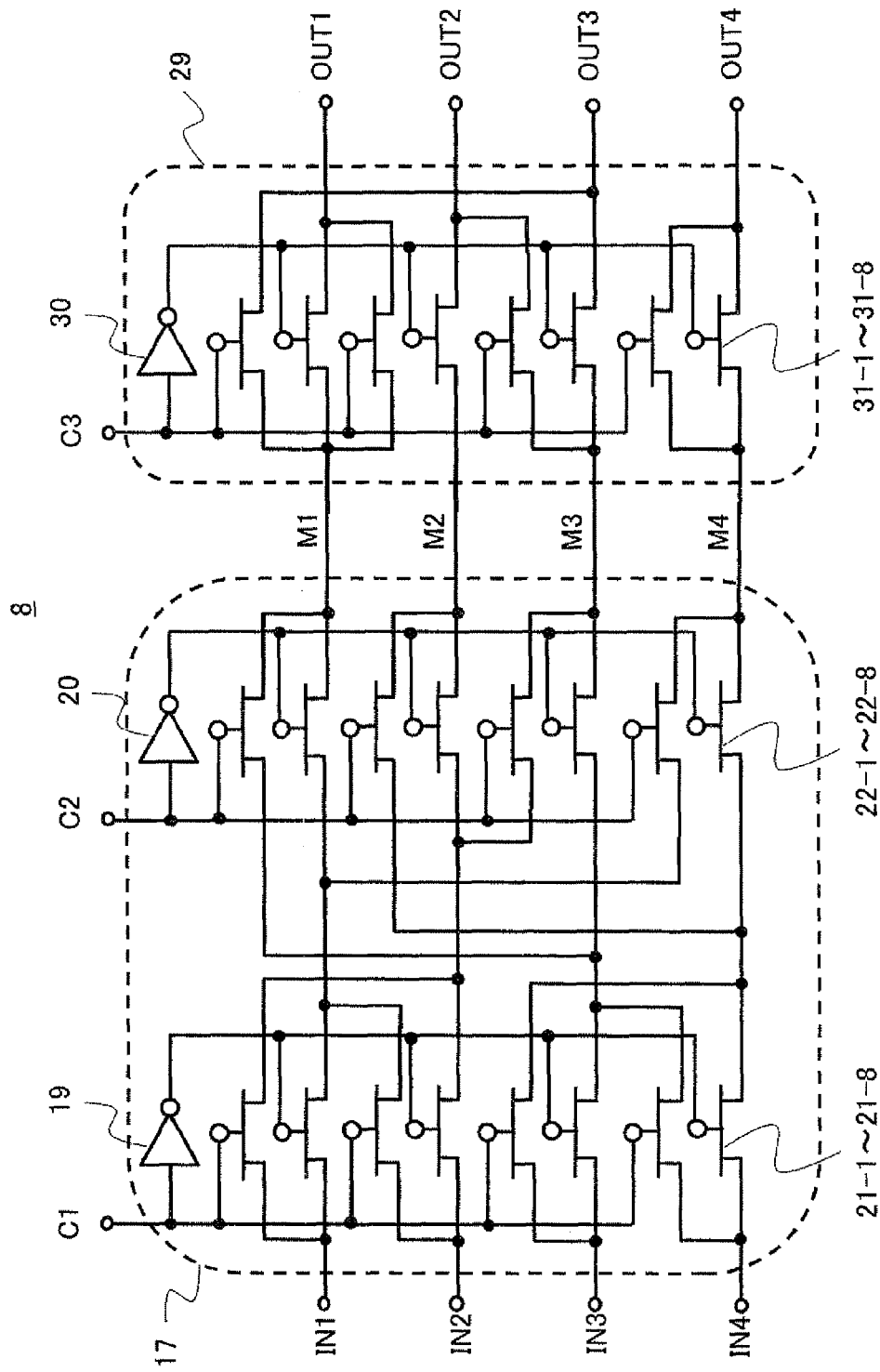
FIG. 5 is a diagram showing a configuration of a phase shifter according to a third exemplary embodiment.

A configuration of a phase shifter according to a third exemplary embodiment of the present invention will be described below with reference to FIG. 5. The transmitting baseband phase shifter 8 shown in FIG. 5 constitutes the transmitting baseband phase shifters 8-1 to 8-n shown in FIG. 1. The transmitting baseband phase shifter 8 shown in FIG. 5 adds phase information indicating any one of 0°, 45°, 90°, 135°, 180°, 225°, 270°, and 315° to baseband signals output from the transmitting baseband signal generation unit 3.

Specifically, in this exemplary embodiment, the baseband phase shifter 8 includes the 90° step phase shifter 17 that contributes to a 90° step phase change, and a 45° phase shifter 29 that contributes to a 45° phase change. The 90° step phase shifter 17 is identical with that of the first exemplary embodiment, so the description thereof is omitted.

The 45° phase shifter 29 includes at least one inverter 30 and eight switching elements 31-1 to 31-8. The switches 31-1 to 31-8 are controlled by the control signal C3. The control signal C3 is supplied from the control unit 4, as with the control signals C1 and C2.

In the same manner as in the first exemplary embodiment, the path switching is executed based on the relation between the phase information (θ) and output signals shown in Table 1 according to the phase information to be added.

The switches 31-1, 31-4, 31-5, and 31-6 are disposed at the same positions as the switches 24-1 to 24-4 shown in FIG. 3 and contribute to a 45° phase change. The provision of the other switches 31-2, 31-3, 31-7, and 31-8 enables compensation for a delay associated with the path switching in the 45° phase shifter 29. Assume that among the switches 31, the switch 31-1 is located at the top of FIG. 5 and the switch 31-8 is located at the bottom of FIG. 5.

The base band signals output from the output terminals OUT1 to OUT4 of the transmitting baseband phase shifter 8 are input to the orthogonal modulator as in the first exemplary embodiment.

Though only the transmitting side is described in this exemplary embodiment, similar operations are performed also on the receiving side.

Fourth Exemplary Embodiment

Figure 6:
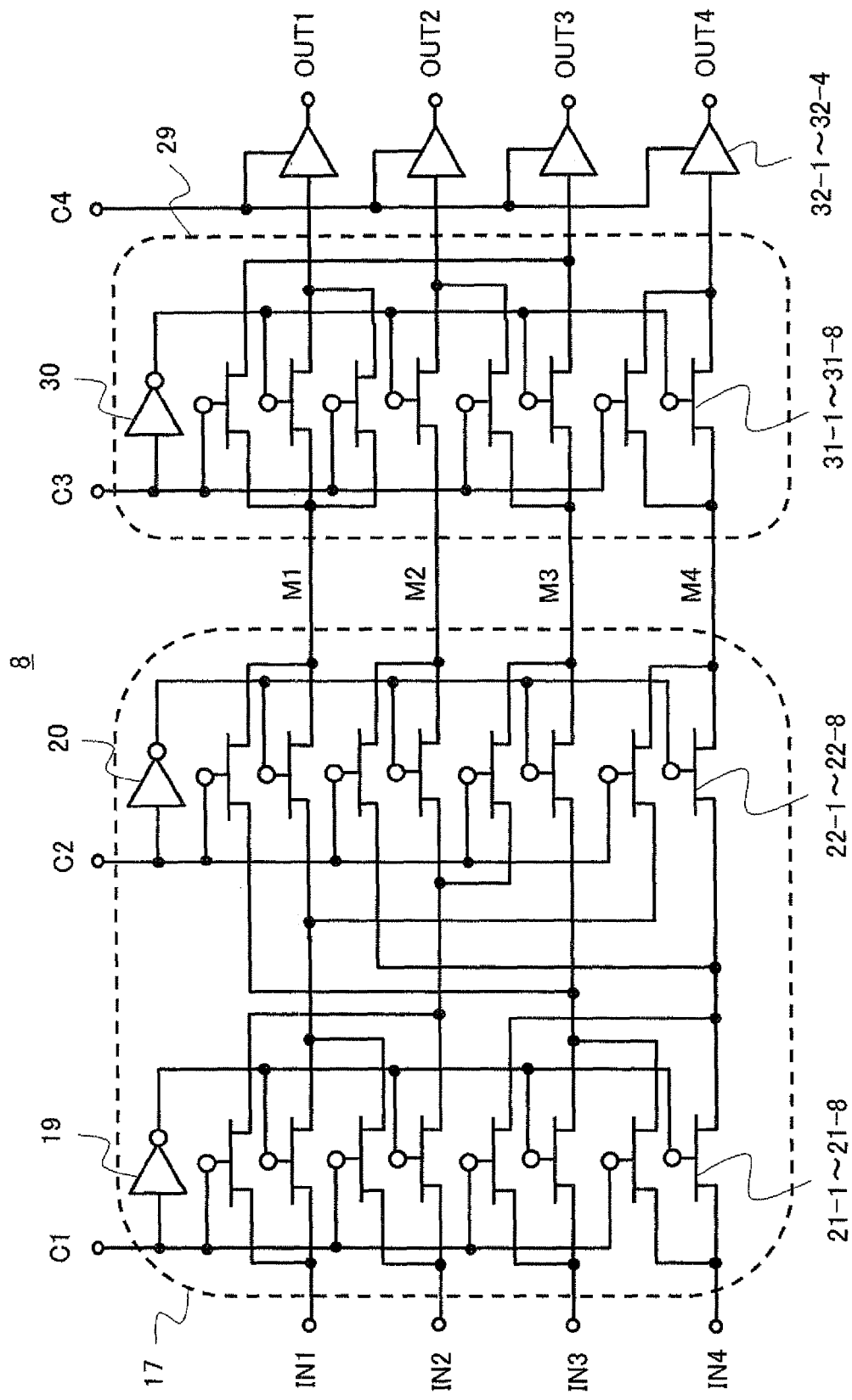
FIG. 6 is a diagram showing a configuration of a phase shifter according to a fourth exemplary embodiment.

A configuration of a phase shifter according to a fourth exemplary embodiment of the present invention will be described below with reference to FIG. 6. The transmitting baseband phase shifter 8 shown in FIG. 6 includes the transmitting baseband phase shifters 8-1 to 8-n shown in FIG. 1. The transmitting baseband phase shifter 8 shown in FIG. 5 adds phase information indicating any one of 0°, 45°, 90°, 135°, 180°, 225°, 270°, and 315° to baseband signals output from the transmitting baseband signal generation unit 3.

Specifically, in this exemplary embodiment, the baseband phase shifter 8 includes the 90° step phase shifter 17 that contributes to a 90° step phase change, and the 45° phase shifter 29 that contributes to a 45° phase change. The 45° phase shifter 29 has output terminals respectively connected to gain variable amplifiers 32-1 to 32-4. The 90° step phase shifter 17 and the 45° phase shifter 29 are identical with those of the third exemplary embodiment, so the description thereof is omitted.

The gain variable amplifiers 32-1 to 32-4 change the amplitude of each baseband signal output from the 45° phase shifter 29 according to a control signal C4 from the control unit 4. In this case, the gain of each of the gain variable amplifiers 32-1 to 32-4 is variable. This makes it possible to correct an amplitude error generated in the 90° step phase shifter 17 and the 45° phase shifter 29.

The baseband signals output from the output terminals OUT1, OUT2, OUT3, and OUT4 of the transmitting baseband phase shifter 8 are input to the orthogonal modulator as in the first exemplary embodiment.

Though only the transmitting side is described in this exemplary embodiment, similar operations are also performed on the receiving side.

Fifth Exemplary Embodiment

Figure 7:
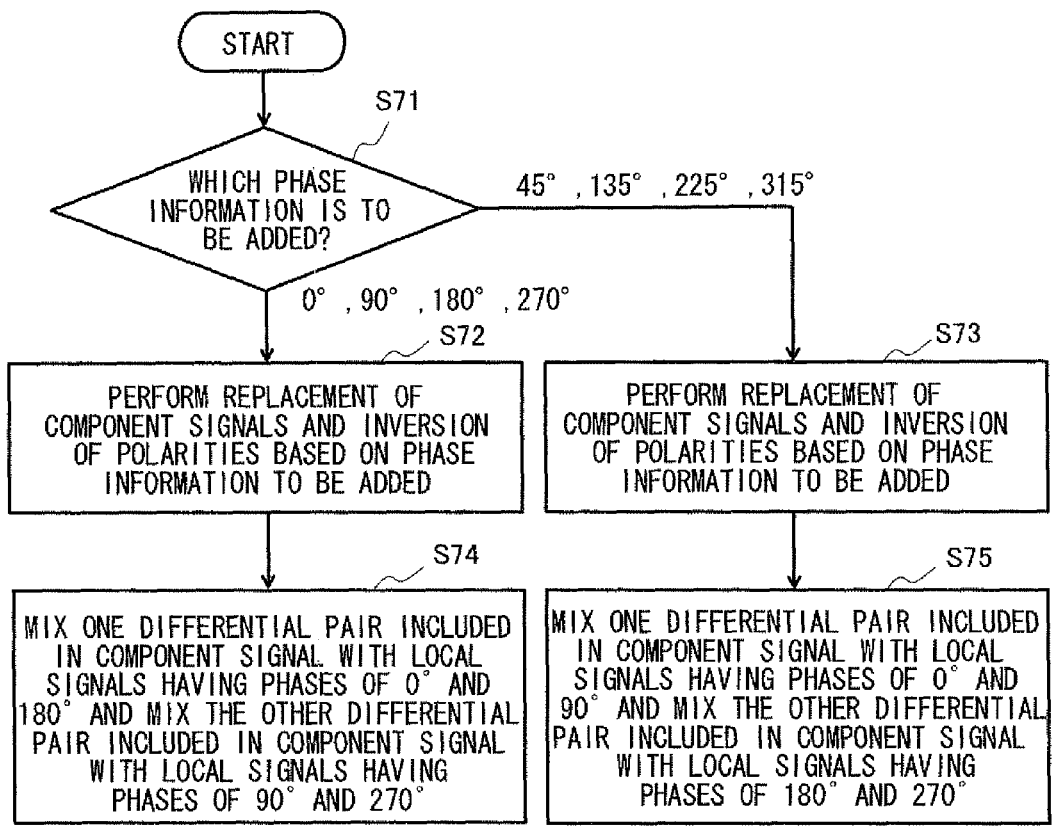
FIG. 7 is a flow chart showing a phase control method according to a fifth exemplary embodiment.

A phase control method according to a fifth exemplary embodiment of the present invention will be described below with reference to FIG. 7. First, the control unit 4 determines which one of the phase information indicating any one of 0°, 90°, 180°, and 270° and the phase information indicating any one of 45°, 135°, 225°, and 315° is added to the baseband signals (S71).

Next, based on the phase information, the transmitting baseband phase shifter 8 performs replacement of the component signals +I, −I, +Q, and −Q of the baseband signals and inversion of polarities according to the relation between the phase information (θ) and output signals illustrated in Table 1 (S72, S73).

When the phase information indicates 0°, 90°, 180°, and 270°, the transmitting orthogonal modulators 9 mix a differential pair of signals forming one of the I signal and the Q signal with local signals having relative phases of 0° and 180°, respectively. Further, the transmitting orthogonal modulators 9 mix a differential pair of signals forming the other of the baseband signals with local signals having relative phases of 90° and 270°, respectively (S74).

On the other hand, when the phase information indicates 45°, 135°, 225°, and 315°, the transmitting orthogonal modulators 9 mix a differential pair of signals forming one of the I signal and the Q signal with local signals having relative phases of 0° and 90°, respectively. Further, the transmitting orthogonal modulators 9 mix a differential pair of signals forming the other of the baseband signals with local signals having relative phases of 180° and 270°, respectively (S75). This enables phase control with a phase resolution of 45°.

Note that the present invention is not limited to the above exemplary embodiments, but can be modified in various manners without departing from the scope of the present invention described above.

This application is based upon and claims the benefit of priority from Japanese patent application No. 2009-117221, filed on May 14, 2009, the disclosure of which is incorporated herein in its entirety by reference.

Reference Signs List

1 TRANSMITTER
2 RECEIVER
3 TRANSMITTING BASEBAND SIGNAL GENERATION UNIT
4 CONTROL UNIT
5 RECEIVING BASEBAND SIGNAL PROCESSING UNIT
6 LOCAL OSCILLATOR
7-1, 7-2 DISTRIBUTOR
8-1 to 8-n TRANSMITTING BASEBAND PHASE SHIFTER
9-1 to 9-n TRANSMITTING ORTHOGONAL MODULATOR
10-1 to 10-n TRANSMITTING AMPLIFIER
11-1 to 11-n TRANSMITTING ANTENNA
12-1, 12-2 COMBINER
13-1 to 13-m RECEIVING BASEBAND PHASE SHIFTER
14-1 to 14-m RECEIVING ORTHOGONAL DEMODULATORS
15-1 to 15-m RECEIVING AMPLIFIER
16-1 to 16-m RECEIVING ANTENNA
17 90° STEP PHASE SHIFTER
18 45° PHASE SHIFTER
19 INVERTER
20 INVERTER
21-1 to 21-8 SWITCH (SWITCHING ELEMENT)
22-1 to 22-8 SWITCH (SWITCHING ELEMENT)
23 INVERTER
24-1 to 24-4 SWITCH (SWITCHING ELEMENT)
25 45° PHASE SHIFTER
26 INVERTER
27 INVERTER
28-1 to 28-4 SWITCH (SWITCHING ELEMENT)
29 45° PHASE SHIFTER
30 INVERTER
31-1 to 31-8 SWITCH (SWITCHING ELEMENT)
32-1 to 32-4 GAIN VARIABLE AMPLIFIERS
101 TRANSMITTING BASEBAND PHASE SHIFTER
102 TRANSMITTING ORTHOGONAL MODULATOR
103 90° STEP PHASE SHIFTER
104 SIGNAL MIXER
105-1 to 105-4 MIXER
106 COMBINER
107 DISTRIBUTOR

The invention claimed is:

1. A phase shifter that adds phase information to two baseband signals to be output to an orthogonal modulator so as to control a phase of an output signal of the orthogonal modulator, the phase shifter comprising:

a 90° step phase shifter that contributes to adding any one of phases 0°, 90°, 180°, and 270° to the baseband signals according to a first control signal; and a 45° phase shifter that contributes to adding one of phases 0° and 45° to the baseband signals according to a second control signal, wherein the phase shifter performs replacement of component signals of one of the baseband signals with component signals of the other of the baseband signals and inversion of polarities of the component signals, and wherein the phase shifter outputs the baseband signals including the phase information to the orthogonal modulator modulating a local signal according to the baseband signals including the phase information.

2. The phase shifter according to claim 1, wherein the phase information indicates any one of values 0°, 45°, 90°, 135°, 180°, 225°, 270°, and 315°, when the phase information indicates any one of 0°, 90°, 180°, and 270°, the phase shifter outputs the component signals of one of the baseband signals received by the phase shifter to mixers receiving local signals having relative phases of 0° and 180°, respectively, and outputs the component signals of the other of the baseband signals to mixers receiving local signals having relative phases of 90° and 270°, respectively, among mixers forming the orthogonal modulator, and when the phase information indicates any one of 45°, 135°, 225°, and 315°, the phase shifter outputs the component signals of one of the baseband signals received by the phase shifter to the mixers receiving the local signals having the relative phases of 0° and 90°, respectively, and outputs the component signals of the other of the baseband signals to the mixers receiving the local signals having the relative phases of 180° and 270°, respectively, among the mixers forming the orthogonal modulator.

3. The phase shifter according to claim 1, wherein
when the phase information indicates any one of 45°, 135°, 225°, and 315°, the phase shifter outputs the component signals of one of the baseband signals to mixers receiving local signals having relative phases of 0° and 90°, respectively, and
the phase shifter branches a signal having one polarity among the component signals of the baseband signals into two signals, outputs the two branched signals to the mixers receiving the local signals having the relative phases of 0° and 90°, and blocks a signal having the other polarity.

4. The phase shifter according to claim 1, wherein
when the phase information indicates any one of 45°, 135°, 225°, and 315°, the phase shifter outputs the component signals of one of the baseband signals to mixers receiving local signals having relative phases of 0° and 90°, respectively, and
the phase shifter outputs a signal having one polarity among the component signals of the baseband signals to the mixer receiving the local signal having the relative phase of 0°, and inverts a polarity of a signal having the other polarity and outputs the inverted signal to the mixer receiving the local signal having the relative phase of 90°.

5. The phase shifter according to claim 1, wherein the 45° phase shifter includes a delay element for each path.

6. The phase shifter according to claim 5, wherein the delay element is a switching element for switching each path.

7. The phase shifter according to claim 1, further comprising a signal amplifier having a variable gain, the signal amplifier being disposed at an output of the 45° phase shifter.

8. A wireless communication apparatus comprising:
a phase shifter according to claim 1; and
an array antenna.

9. A wireless transmitter comprising:
a phase shifter according to claim 1; and
an array antenna.

10. A wireless receiver comprising:
a phase shifter according to claim 1; and
an array antenna.

11. A phase control method that adds phase information to two baseband signals to be mixed with a local signal so as to control a phase of an output signal of an orthogonal modulator, the phase control method comprising:
performing replacement of component signals of one of the baseband signals with component signals of the other of the baseband signals and inversion of polarities of the component signals, based on phase information indicating any one of 0°, 45°, 90°, 135°, 180°, 225°, 270°, and 315°, the phase information being added to the two baseband signals to be mixed with the local signal; and
executing an orthogonal modulation by modulating the local signal according to the baseband signals including the phase information,
wherein the execution of the orthogonal modulation includes:
mixing the component signals of one of the baseband signals with local signals having relative phases of 0° and 180°, respectively, and mixing the component signals of the other of the baseband signals with local signals having relative phases of 90° and 270°, respectively, when the phase information indicates any one of 0°, 90°, 180°, and 270°; and
mixing the component signals of one of the baseband signals with the local signals having the relative phases of 0° and 90°, respectively, and mixing the component signals of the other of the baseband signals with the local signals having the relative phases of 180° and 270°, respectively, when the phase information indicates any one of 45°, 135°, 225°, and 315°.

12. The phase control method according to claim 11, wherein
when the phase information indicates any one of 45°, 135°, 225°, and 315°, a signal having one polarity among the component signals of one of the baseband signals is divided into two signals, and
the two signals are mixed with the local signals having the relative phases of 0° and 90°, respectively, and a signal having the other polarity is blocked.

13. The phase control method according to claim 11, wherein
when the phase information indicates any one of 45°, 135°, 225°, and 315°, a signal having one polarity among the component signals of one of the baseband signals is mixed with the local signal having the relative phase of 0°, and the polarity of a signal having the other polarity is inverted and mixed with the local signal having the relative phase of 90°.

14. The phase shifter according to claim 2, wherein
when the phase information indicates any one of 45°, 135°, 225°, and 315°, the phase shifter outputs the component signals of one of the baseband signals to mixers receiving local signals having relative phases of 0° and 90°, respectively, and
the phase shifter branches a signal having one polarity among the component signals of the baseband signals into two signals, outputs the two branched signals to the mixers receiving the local signals having the relative phases of 0° and 90°, and blocks a signal having the other polarity.

15. The phase shifter according to claim 2, wherein
when the phase information indicates any one of 45°, 135°, 225°, and 315°, the phase shifter outputs the component signals of one of the baseband signals to mixers receiving local signals having relative phases of 0° and 90°, respectively, and
the phase shifter outputs a signal having one polarity among the component signals of the baseband signals to the mixer receiving the local signal having the relative phase of 0°, and inverts a polarity of a signal having the other polarity and outputs the inverted signal to the mixer receiving the local signal having the relative phase of 90°.

16. The phase shifter according to claim 2, wherein the 45° phase shifter includes a delay element for each path.

17. The phase shifter according to claim 3, wherein the 45° phase shifter includes a delay element for each path.

18. The phase shifter according to claim 4, wherein the 45° phase shifter includes a delay element for each path.

19. The phase shifter according to claim 2, further comprising a signal amplifier having a variable gain, the signal amplifier being disposed at an output of the 45° phase shifter.

20. The phase shifter according to claim 3, further comprising a signal amplifier having a variable gain, the signal amplifier being disposed at an output of the 45° phase shifter.

* * * * *

UNITED STATES PATENT AND TRADEMARK OFFICE
CERTIFICATE OF CORRECTION

PATENT NO. : 8,665,989 B2 Page 1 of 1
APPLICATION NO. : 13/264046
DATED : March 4, 2014
INVENTOR(S) : Shuya Kishimoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this
Twenty-ninth Day of September, 2015

Michelle K. Lee
*Director of the United States Patent and Trademark Office*